Nov. 30, 1926.
A. SUNDH
COUPLING
Filed March 8, 1924
1,608,633
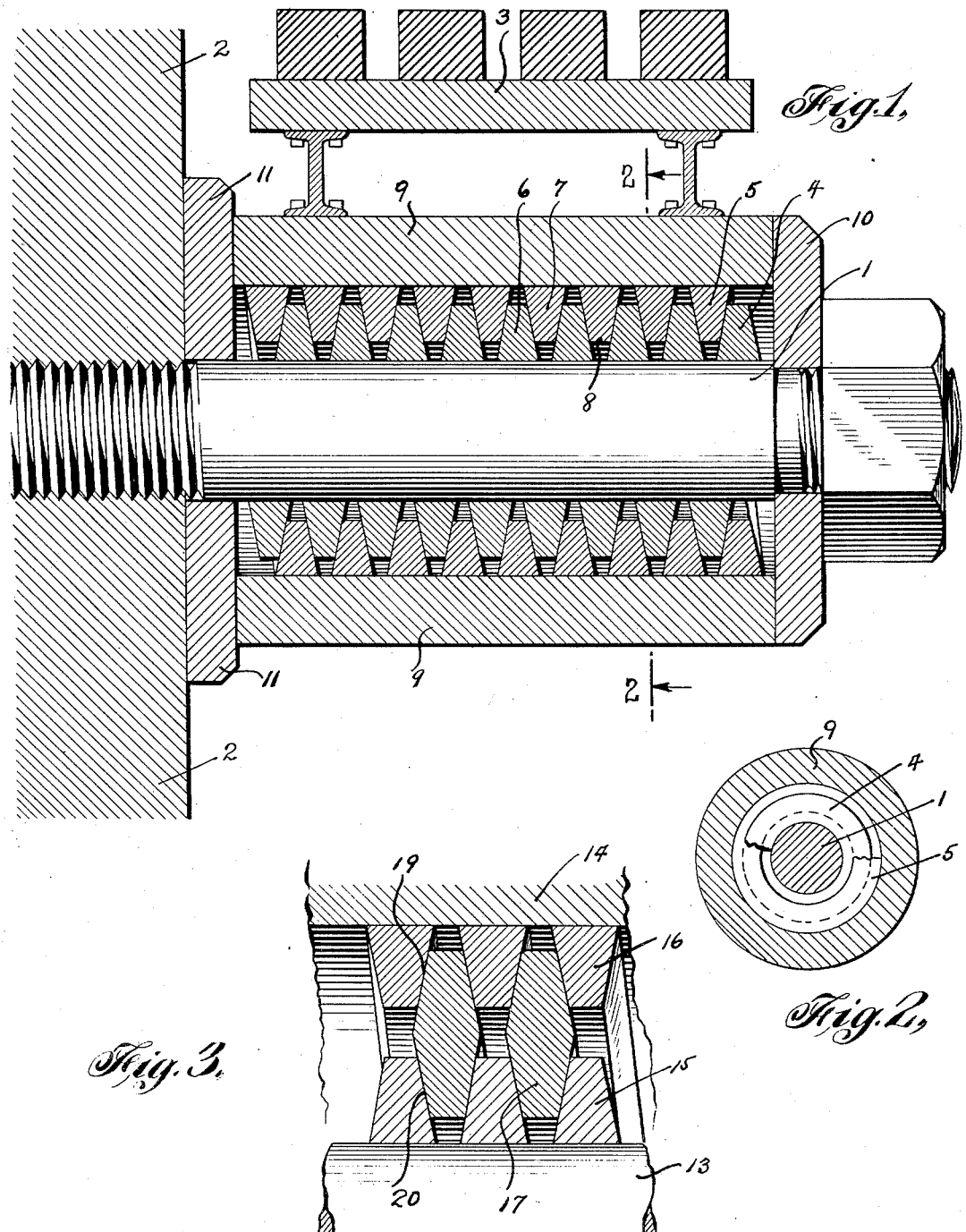

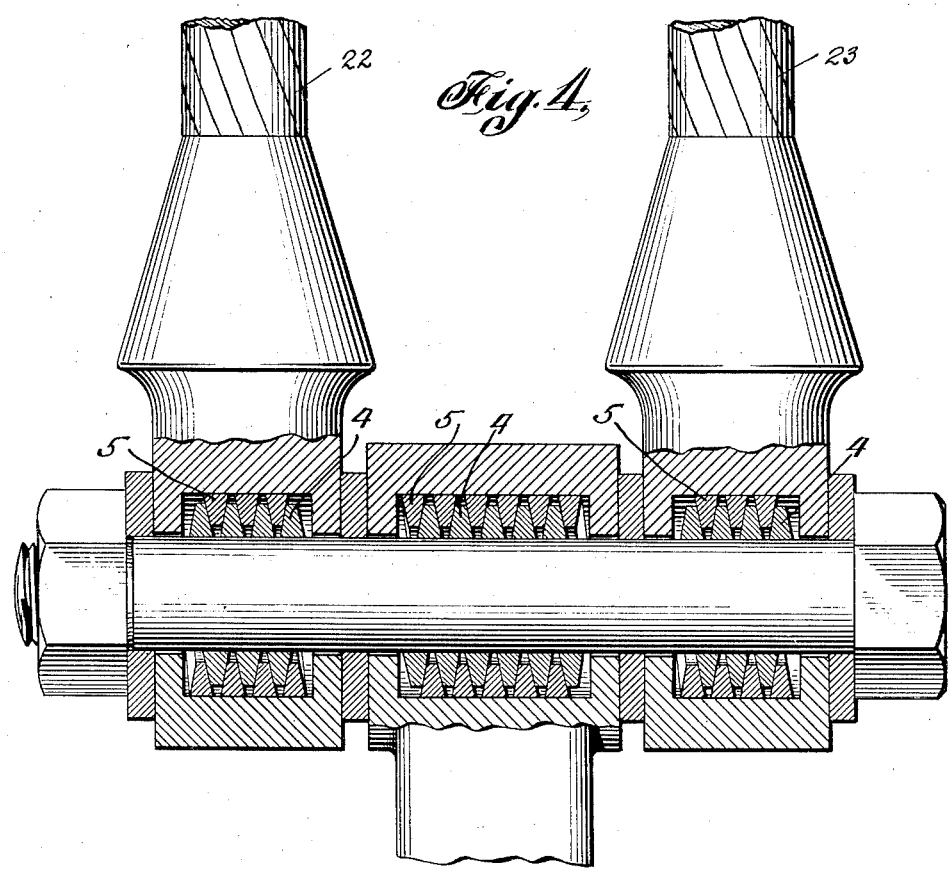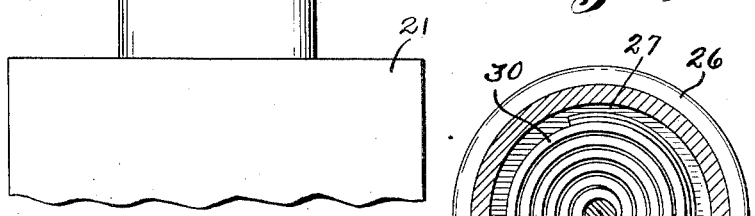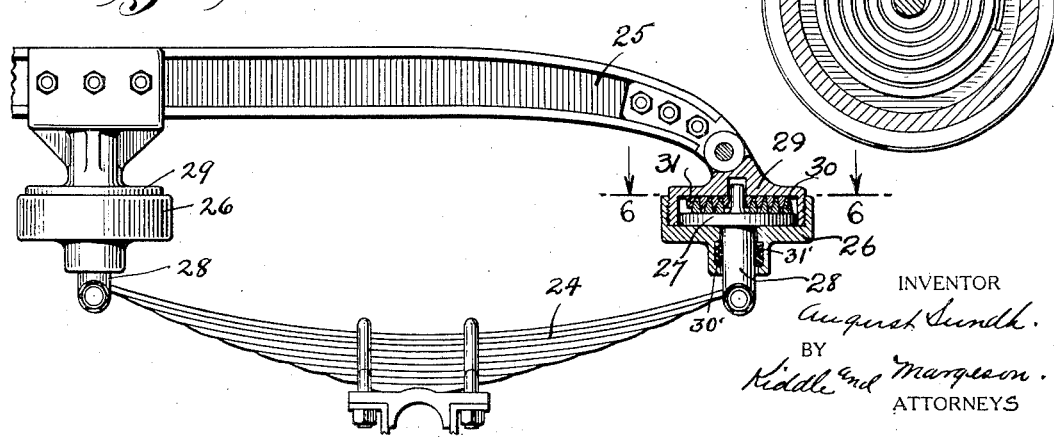

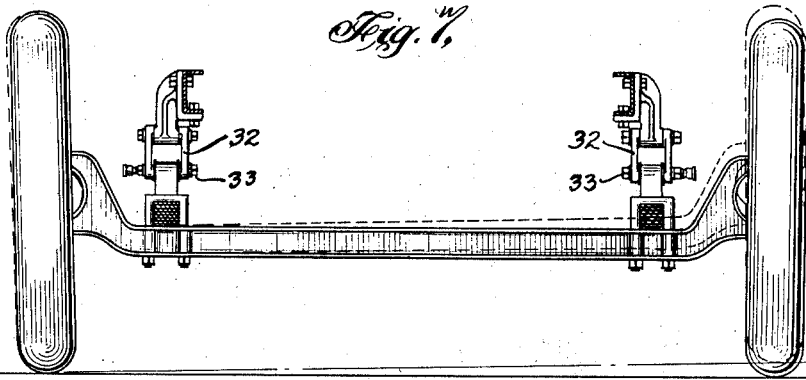
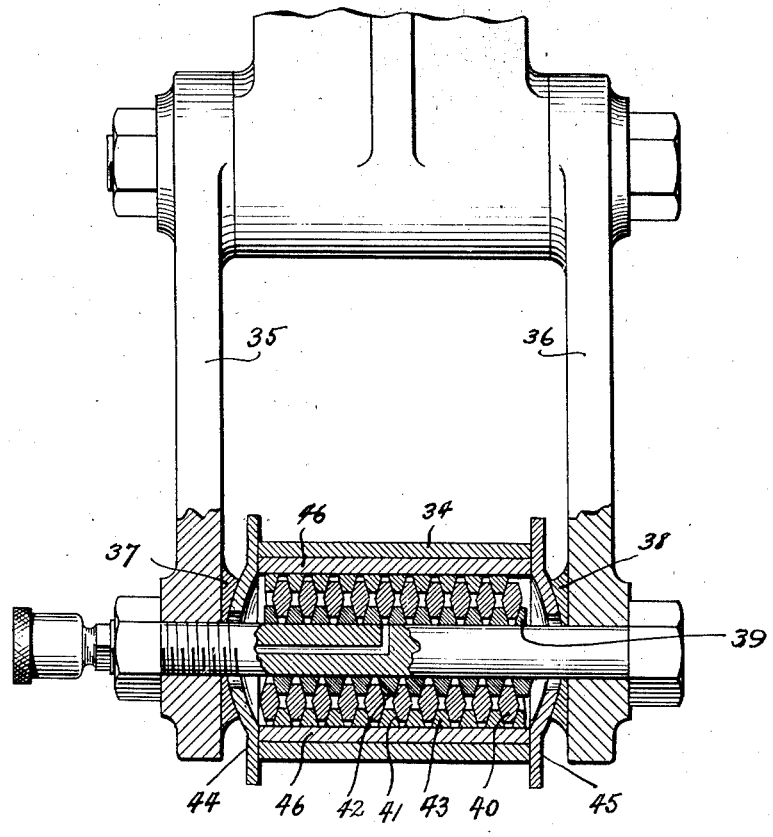

Patented Nov. 30, 1926.

1,608,633

UNITED STATES PATENT OFFICE.

AUGUST SUNDH, OF HASTINGS-UPON-HUDSON, NEW YORK.

COUPLING.

Application filed March 3, 1924. Serial No. 697,732.

My invention relates to an improved mechanism in which stresses are transmitted from one member to another, and an object thereof is to provide an improved structure adapted for use wherever flexibility or shock-absorbing characteristics are desired.

My improved mechanism may be used for transmitting power from one member to another or may be used for merely flexibly connecting two members together, but, for the sake of clarity, I will hereinafter refer to my improved apparatus as a "flexible coupling".

In the drawings, presently to be described, I have shown several embodiments of my invention—one embodiment showing the invention applied as a coupling for coupling two members together where considerable power is exerted on the coupling, while in other embodiments of my invention illustrated I have shown the same applied to the spring shackles of an automobile wherein the apparatus is employed chiefly for flexibility and shock-absorbing purposes.

So far as the application of my apparatus to spring shackles is concerned, I might say that heretofore it has been customary to connect the automobile spring to a rigid bolt forming a part of the spring shackle and usually termed a "shackle bolt". Inasmuch as two sets of springs are provided, one at each side of the chassis of the automobile, it becomes necessary to provide two shackles, with the result that when the car is traveling over uneven surfaces, such as an uneven road bed, great stress—particularly what might be termed a "twisting strain"—is brought upon the shackle bolts. This results in wear on the bolts and, of course, subjects the chassis to uneven strains, which are very undesirable and, as a matter of fact, often results in breaking of the springs. This trouble is all obviated by incorporating my improved structure, as will be clearly pointed out hereinafter.

In general, my improved apparatus comprises two yielding members interposed between the two members to be attached to each other, these yielding members being interthreaded, so to speak, and adapted to yield under stress.

Specifically, my improved apparatus comprises a resilient annular system interposed between the two members to be connected or coupled, this annular system consisting of two or more springs having their convolutions intermeshed and so shaped that the spring members will yield under load longitudinally so as to permit of retarded, relative, radial movement of the members composing the annular system.

In the accompanying drawings—

Figure 1 shows in sectional elevation one embodiment of my invention;

Fig. 2 being a section taken on the line 2—2 of Fig. 1;

Fig. 3 is a fragmentary sectional elevation of a modified form of my invention;

Fig. 4 is a sectional elevational view showing my invention applied to a hoist;

Fig. 5 is a part sectional elevational view of my improved apparatus applied to the spring shackles of an automobile;

Fig. 6 is a view on the line 6—6 of Fig. 5;

Fig. 7 is a further modification and shows a modified form of my apparatus applied to the spring shackles of an automobile, and Fig. 8 is an enlarged sectional view of the apparatus of Fig. 7.

Referring first of all to Figs. 1 and 2, 1 designates a load-supporting or load-carrying member, which may be in the form of a shaft, for example, secured in any suitable manner to a member 2. 3 designates the load which is to be resiliently attached to or carried by the member 1, and interposed between the member 3 and the member 1 and surrounding the member 1 is a resilient annular system comprising two springs 4 and 5, the convolutions of these springs intermeshing or nesting. The spring 5 is larger in diameter than the spring 4, and hence might be said to telescope the same, and the convolutions 6 of the spring 4 are positioned between the convolutions 7 of the larger spring 5. The cross-section of the convolutions of these springs is tapered, the apex 8 of the taper in both instances being at the periphery of the springs. This arrangement provides wedge-shaped surfaces adapted to effect a gradually increasing resistance to relative axial movement of the two springs constituting, in the present instance, the resilient annular system of my improved apparatus.

The springs 4 and 5 are enclosed in a sleeve 9 held in place on the member 1 by an end-plate 10. The opposite end of the sleeve 9 is preferably also provided with a similar plate 11. The load 3 is attached to this sleeve.

It will be seen from the foregoing that the load 3 is resiliently mounted on the load-supporting member 1 through the interposition of the resilient annular system comprising the two springs 4 and 5 and that the periphery of the spring 4 is placed some distance from the inner wall of the sleeve 9, while the spring 5 is interposed some distance from the member 1, permitting the member 1 and sleeve 9 to approach each other, but, inasmuch as the convolutions of the two springs are intermeshed and inasmuch as these convolutions are tapered in cross-section, it will be seen that any movement of the sleeve 9 and spring 5 toward the member 1 or any movement of the member 1 toward the sleeve 9 will be gradually retarded, this movement causing the springs 4 and 5 to elongate. This retarding or slowing-up action gradually increases as the springs are lengthened more and more and, consequently, it will be seen that any sudden application of force to my improved structure, tending to cause the load 3 to be drawn away from the load-supporting member 1, will be absorbed in a gradual manner to prevent excessive and undue shocks to the structure as a whole.

In Fig. 3 I have departed somewhat from the structure just described, although the principle of operation is the same or similar. In this embodiment of my invention, 13 designates what I will term a "load-supporting member", while 14 designates the load. Interposed between 14 and 13 is a resilient annular system, quite similar in principle to the system of Fig. 1, and comprising springs 15 and 16. The spring 16 is of larger internal diameter than the external diameter of the spring 15. The convolutions of these springs, while tapered in cross-section, as in Fig. 1, do not intermesh. To obtain the same result as in the apparatus of Fig. 1,—that is to say, a gradually increasing resistance to relative movement between the members 13 and 14,—I interpose between the springs 15 and 16 a third spring 17, the convolutions of this spring intermeshing with the convolutions of the springs 15 and 16. The convolutions of the spring 17 are double tapered in cross-section,—that is to say, the member 17 or the convolutions thereof are provided with two tapers 19 and 20.

In operation, when the members 13 and 14 tend to approach each other, the wedge-shaped convolutions of the spring 17 will be forced between the convolutions of the springs 15 and 16, causing the latter to elongate, the resistance to elongation of these springs, of course, increasing to thereby gradually and increasingly resist the approach of the members 13 and 14 to each other. This construction, therefore, also provides, as in the case of Fig. 1, means for forming a yielding connection between two members and adapted to yield proportionately to the load transmitted.

In Fig. 4 I have shown my improved structure applied to a hoist, 21 designating the load to be lifted, while 22 and 23 designate the hoist cables. In this form or embodiment of my invention I have provided three (3) of my improved devices, each of which corresponds to the structure of Fig. 1, and the same reference characters have been applied to this figure as used in Fig. 1 and hence a further description of this figure will not be given.

In Figs. 5 and 6 a modified form of my invention has been applied to an automobile for attaching the springs thereof to the chassis, 24 designating the springs, while 25 designates the frame of the chassis. In this instance spiral springs instead of helically-wound springs have been employed. 26 designates a cup in which is seated a plate 27 provided with a downwardly-extending lug 28 which is attached to the ends of the springs 24. To the end of the chassis frame 25 I attach a plate or cup 29, this plate or cup 29 providing an end closure for the apparatus together with the cup 26. Interposed between the plate 27 and cap or cup 29 are two helically-wound springs 30 and 31, the convolutions of which are tapered in cross-section and intermeshed to provide a shock-absorbing and resilient connection between the springs 24 and the chassis frame 25, the upward movement of the plate 27 attached to the springs, as viewed in Fig. 5, being resisted by the intermeshed springs 30 and 31, this resistance increasing as the plate 27 approaches the upper limit of its travel, due to the intermeshed convolutions of the springs 30 and 31 and due to the tapered formation of these convolutions, this tapered formation causing the convolutions of the springs to spread apart. Surrounding the lug 28 are a pair of nested springs 30' and 31' similar to the springs 30 and 31, these springs being provided for the purpose of taking up the side play of the lug 28.

Referring to the embodiment of my invention illustrated in Figs. 7 and 8, 32 designates a spring shackle of an automobile and 33 designates the shackle bolts. As above pointed out, it is customary to provide a rigid, or substantially so, connection between the bolts 33 and the spring 34 and, due to unevenness in the road bed when the automobile is in operation, great stresses are placed on the shackle bolts as well as on the springs themselves, causing breaking of the springs and of the bolts, wearing out of the bolts, and unnecessary shocks to the automobile. To eliminate these drawbacks, I interpose helically-wound nested springs between the spring 34 and the shackle bolt 33, this arrangement, together with other novel features of my improved construction, permitting of yielding action in all directions when the apparatus is in use.

From an inspection of Fig. 8 it will be seen that the shackle arms 35 and 36 receiving the shackle bolt 33 above referred to and carried on this bolt at each end thereof and on the inner side of the shackle arms 35 and 36 are concaved washers 37 and 38. The shackle bolt 33 carries a helically-wound spring 39, the convolutions of which are tapered in cross-section similar to the construction shown in Fig. 3, for example. Surrounding this spring is another helically-wound spring 40, the convolutions of which nest with the convolutions of the spring 39. The convolutions of the spring 40 are tapered in cross-section, as indicated at 41 and at 42. On the outside of the springs 39 and 40 I provide a third spring, also helically wound, designated 43. The convolutions of this spring nest with the convolutions of the spring 40 and are also tapered in cross-section. At each end of this annular system I provide washers 44 and 45 loosely fitting the shackle bolt 33, the face of these washers adjacent the washers 37 and 38 being convexed and co-operating with the concaved face of the washers 37 and 38. Between the plates 44 and 45 and surrounding the springs 39, 40 and 43 I provide a sleeve 46, and to this sleeve is secured the spring 34. The spring 34 is adapted to have a sliding action relatively to the end plates 44 and 45, this sliding action being cushioned by the springs 39, 40 and 43, this cushioning action being controlled by the springs themselves, and when the spring 34 is moved in a direction toward the shackle bolt 33, it will be apparent that the helically-wound spring surrounding the shackle bolt will effect a gradually increasing resistance to this movement. By providing the convexed end plates 44 and 45 which, as above noted, loosely fit the shackle bolt 33, a certain amount of twisting between the spring 34 and the shackle bolt is permitted, this twisting action also being cushioned by the springs 39, 40 and 43, whereby the destructive strains which are now imposed upon the shackle bolt 33 and the shackle arms 35 and 36 will be eliminated or greatly reduced. In other words, I have provided practically a universal connection between the spring 34 and the spring shackle, permitting of universal movement substantially between the spring and the shackle. It will be understood that the nested springs 39, 40 and 43 elongate when the spring 34 and shackle bolt 33 move relatively and, consequently offer resistance to this relative movement, this resistance gradually increasing as the springs elongate.

It will be seen from the foregoing that I have provided improved mechanism by which two members may be coupled or attached to each other to thereby relieve the two attached members of injurious shocks and stresses, these shocks and stresses being taken up by the nested resilient members which are interposed between the two members to be attached to each other. It will be seen also that in all the forms of my invention here illustrated and above described, a more or less universal relative movement is permitted at all times, this universal movement, however, being controlled by the connecting or coupling apparatus itself,—that is to say, by the particular form of mechanism employed. It will be seen also that in the form of my invention illustrated in Figs. 7 and 8, for instance, an improved construction for attaching an automobile spring or springs to the chassis has been provided, wherein the great stresses on the shackle and shackle bolt, due to present constructions, have been eliminated.

It is to be understood that changes may be made in the details of construction of my invention within the purview thereof.

What I claim is:

1. In a mechanism in which stresses are transmitted from one part to another part and in which said parts have relative angular movement, interposed intermeshed springs adapted to yield longitudinally due to relative movement of the two springs.

2. In an apparatus in which stresses are transmitted from one part to another, yielding means interposed between said parts and consisting of helically-wound nested springs so constructed and arranged as to yield longitudinally under stresses transmitted from one of said parts to the other of said parts.

3. In a mechanism in which stresses are transmitted from one part to another part at an angle thereto, means providing a yielding connection interposed between said two parts and adapted to yield proportionately to the stresses, said means consisting of intermeshed springs adapted to yield longitudinally in all directions.

4. In a mechanism in which stresses are transmitted from one part to another part transversely thereof, interposed intermeshed resilient members for transmitting stresses from one of said parts to the other of said parts, the intermeshed portions of said resilient members being tapered in cross-section.

5. In a mechanism in which stresses are transmitted from one part to another part transversely thereof, yielding means between said parts consisting of helically-wound springs, said springs being positioned relatively to each other to cause the convolutions thereof to yield proportionately to the stresses transmitted.

6. In a mechanism in which stresses are transmitted from one part to another part, yielding means between said parts consisting of helically-wound springs having their convolutions interthreaded or nested and arranged to yield longitudinally when subjected to transverse stresses.

7. In a mechanism for transmitting stresses from one part to another part in a direction transverse to one of said parts, interposed springs, the convolutions of which are shaped to permit of nesting of the convolutions and to permit of resilient relative movement of said interposed springs when the first mentioned parts move relatively.

8. In a mechanism in which stresses are transmitted from one part to another part, yielding means between said parts consisting of helically-wound springs of different diameters having their convolutions intermeshed and adapted to transmit stresses from one of the first mentioned parts to the other of the first mentioned parts in a direction transverse to the yielding means, said yielding means yielding longitudinally under the action of said stresses.

9. In a mechanism in which stresses are transmitted from one part to another part yielding means interposed between said parts and consisting of helically-wound springs, one larger in diameter than the other, and having their convolutions intermeshed, the outside diameter of the convolutions of the inside spring being smaller than the outside diameter of the convolutions of the outside spring whereby relative movement of the two parts between which stresses are transmitted by said springs will cause the springs to yield longitudinally.

10. In a mechanism for yieldingly attaching two members together, resilient means interposed between the said two members and comprising two helically-wound springs having tapered convolutions, the convolutions of one spring intermeshing with the convolutions of the other spring, whereby relative movement of one of the first mentioned two members transversely will cause said springs to elongate, the resistance to elongation of the springs controlling the relative movement thereof.

11. In combination two members, a pair of interposed resilient members for attaching these two members to each other, one of said two members having movement transversely of the resilient members, and a third member interposed between the resilient members and intermeshing therewith to control the relative movement of the two first-mentioned members.

12. In combination two members to be attached to each other, a pair of interposed resilient members, a helically-wound intermediate member intermeshed with the convolutions of said interposed resilient members, the convolutions of the resilient members and of the intermediate member being tapered whereby a gradually increasing resistance will be offered to the relative movement of the two members first mentioned transversely of the said interposed resilient members.

13. In combination two members to be attached to each other, a pair of interposed helically-wound resilient members, the convolutions of said resilient members being tapered in cross-section, and an intermediate helically-wound resilient member having tapered convolutions and intermeshing with the tapered convolutions of the interposed resilient members, one of the two members first mentioned having movement transversely of the interposed resilient members, a gradually increasing resistance to this movement being offered by the engagement of the tapered convolutions of the intermediate member with the tapered convolutions of the two interposed resilient members.

14. In combination a shackle bolt, a spring, and a yielding connection between said shackle bolt and spring and comprising superimposed intermeshing springs for permitting relative movement between said shackle bolt and spring.

15. In combination a shackle bolt, a helically-wound spring carried thereon, a spring to be yieldingly attached to said shackle bolt, and a helically-wound spring interposed between the last-mentioned spring and the first-mentioned helically-wound spring, the convolutions of the helically-wound springs intermeshing to permit of controlled movement between the spring and shackle bolt.

16. In combination a shackle, a shackle bolt, a spring, a housing carried by said shackle bolt, and two intermeshed springs within said housing and interposed between the housing and shackle bolt to yieldingly connect the shackle and the first-mentioned spring.

17. In combination a shackle, a shackle bolt, a housing mounted on said shackle bolt and having a twisting movement relatively to said shackle bolt, and intermeshed springs interposed between the housing and shackle bolt for controlling this twisting movement of the housing relatively to the shackle bolt.

18. In combination a shackle, a shackle bolt, a housing, end members for the housing having a bearing in said shackle and adapted to be moved in said bearing, a spring attached to said housing, and intermeshing nested springs interposed between said housing and shackle bolt, said nested springs controlling the movement of said housing and its bearing in said shackle.

19. In an automobile, a shackle device for connecting the springs and frame of the automobile, said shackle device comprising helically-wound intermeshed springs for permitting yielding action in all directions when the automobile is in motion.

20. In an automobile, means for connecting the spring and frame of the automobile and comprising a housing, a shackle bolt passing through said housing and helically-wound nested springs in said housing and cooperating to permit a yielding action in all directions between the spring and frame of the automobile.

21. In combination a shackle, a shackle bolt, a housing on said shackle bolt, a spring attached to said housing, intermeshed springs between said housing and shackle bolt, said housing being mounted on said shackle bolt for movement relatively thereto, said movement being controlled by the said intermeshed springs.

22. In combination a shackle, a shackle bolt, a housing on said shackle bolt and having movement relatively thereto, a bearing in said shackle for said housing, a spring mounted on the exterior of said housing, and intermeshed springs mounted within said housing for controlling the relative movement between said housing and shackle bolt.

This specification signed this 28th day of February, 1924.

AUGUST SUNDH.